United States Patent
Zheng et al.

(10) Patent No.: US 12,432,602 B2
(45) Date of Patent: Sep. 30, 2025

(54) MEASUREMENT CONTROL METHOD, TERMINAL, AND NETWORK-SIDE DEVICE

(71) Applicant: VIVO MOBILE COMMUNICATION CO., LTD., Guangdong (CN)

(72) Inventors: Qian Zheng, Guangdong (CN); Xiaodong Yang, Guangdong (CN); Wei Bao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/296,696

(22) Filed: Apr. 6, 2023

(65) Prior Publication Data

US 2023/0247468 A1 Aug. 3, 2023

Related U.S. Application Data

(63) Continuation of application No. 17/099,616, filed on Nov. 16, 2020, now abandoned, which is a
(Continued)

(30) Foreign Application Priority Data

May 16, 2018 (CN) .......................... 201810470235.5

(51) Int. Cl.
*H04B 17/20* (2015.01)
*H04B 17/24* (2015.01)
(Continued)

(52) U.S. Cl.
CPC ............ *H04W 24/10* (2013.01); *H04B 17/24* (2015.01); *H04B 17/255* (2023.05);
(Continued)

(58) Field of Classification Search
CPC .... H04B 17/0082–3913; H04J 11/0023–0093; H04L 5/003–0098;
(Continued)

(56) References Cited

U.S. PATENT DOCUMENTS

2013/0053082 A1 2/2013 Chai et al.
2014/0287694 A1 9/2014 Kim et al.
(Continued)

FOREIGN PATENT DOCUMENTS

CN 102149106 A 8/2011
CN 102237936 A 11/2011
(Continued)

OTHER PUBLICATIONS

CN Office Action in Application No. 201810470235.5 dated Apr. 14, 2020.
(Continued)

*Primary Examiner* — Timothy J Weidner
(74) *Attorney, Agent, or Firm* — BROOKS KUSHMAN P.C.

(57) ABSTRACT

A measurement control method, a terminal, and a network-side device are provided. The terminal is configured with measurement configuration information for a non-connected state. A terminal-side measurement control method includes: obtaining a first system message sent by a network-side device, and controlling at least one of the measurement configuration information, a measurement validity timer, a measurement behavior, and a measurement result based on the first system message.

16 Claims, 4 Drawing Sheets

Related U.S. Application Data continuation of application No. PCT/CN2019/086784, filed on May 14, 2019.

(51) Int. Cl.
  *H04W 24/08* (2009.01)
  *H04W 24/10* (2009.01)
  *H04W 36/00* (2009.01)
  *H04W 84/02* (2009.01)
  *H04W 88/02* (2009.01)
  *H04W 88/08* (2009.01)
  *H04W 92/02* (2009.01)
  *H04W 92/10* (2009.01)

(52) U.S. Cl.
  CPC ....... *H04W 24/08* (2013.01); *H04W 36/0058* (2018.08); *H04W 36/0085* (2018.08); *H04W 84/02* (2013.01); *H04W 88/02* (2013.01); *H04W 88/08* (2013.01); *H04W 92/02* (2013.01); *H04W 92/10* (2013.01)

(58) Field of Classification Search
  CPC ..... H04W 8/22–245; H04W 24/02–10; H04W 36/0005–385; H04W 48/02–20; H04W 72/02–569; H04W 74/002–008; H04W 76/10–50; H04W 84/02–16; H04W 88/005–12; H04W 92/02; H04W 92/04; H04W 92/10
  See application file for complete search history.

(56) References Cited

U.S. PATENT DOCUMENTS

| | | | |
|---|---|---|---|
| 2016/0242076 A1 | 8/2016 | Lee et al. | |
| 2018/0270682 A1* | 9/2018 | Zacharias | H04W 24/10 |
| 2019/0037425 A1 | 1/2019 | Hong et al. | |
| 2021/0105707 A1* | 4/2021 | Virtej | H04W 24/10 |
| 2021/0120447 A1 | 4/2021 | Zhou et al. | |
| 2021/0120623 A1 | 4/2021 | Zheng et al. | |
| 2021/0153058 A1 | 5/2021 | Zheng et al. | |

FOREIGN PATENT DOCUMENTS

| | | |
|---|---|---|
| CN | 102685671 A | 9/2012 |
| CN | 104093162 A | 10/2014 |
| CN | 107040956 A | 8/2017 |

OTHER PUBLICATIONS

Written Opinion and International Search Report in Application No. PCT/CN2019/086784 dated Nov. 26, 2020.
"Signaling for euCA" 3GPP TSG-RAN WG2 Meeting #102, R2-1806526, Busan, South Korea, May 21, 2018. Nokia.
"Discussion on continuing idle mode measurement" 3GPP TSG-RAN WG2 Meeting #102, R2-1808345, Busan, South Korea, May 21, 2018. Huawei.
"Discussion on UE behavior related to SIB2 idle measurement indication" 3GPP TSG-RAN WG2 Meeting #103, R.2-1811910, Gothenburg, Sweden, Aug. 20, 2018. Vivo.
3GPP TS 36.331 V15.3.0 (Sep. 2018), 3rd Generation Partnership Project; Technical Specification Group Radio Access Network; Evolved Universal Terrestrial Radio Access (E-UTRA); Radio Resource Control (RRC); Protocol specification, (Release 15), 2018, 3GPP Organizational Partners (ARIB, ATIS, CCSA, ETSI, TSDSI, TTA, TTC).
European Search Report dated Jun. 21, 2021 as received in application No. 19804387.9.
Non-final Rejection for U.S. Appl. No. 17/099,616, dated Feb. 17, 2022, 25 Pages.
Final Rejection for U.S. Appl. No. 17/099,616, dated Jun. 9, 2022, 26 Pages.
Final Rejection for U.S. Appl. No. 17/099,616, dated Jan. 6, 2023, 23 Pages.
International Search Report and Written Opinion for Application No. PCT/CN2019/086784, dated Aug. 12, 2019, 8 Pages.

* cited by examiner

MEASUREMENT CONTROL METHOD, TERMINAL, AND NETWORK-SIDE DEVICE

CROSS-REFERENCE TO RELATED APPLICATIONS

This application is a continuation application of U.S. patent application Ser. No. 17/099,616 filed on Nov. 16, 2020, which is a continuation of International Application No. PCT/CN2019/086784 filed on May 14, 2019, which claims priority to Chinese Patent Application No. 201810470235.5 filed on May 16, 2018, which are incorporated herein by reference in their entireties.

TECHNICAL FIELD

This disclosure relates to the field of communications technologies, and in particular, to a measurement control method, a terminal, and a network-side device.

BACKGROUND

The long term evolution (LTE) system introduces a carrier aggregation technology and a fast carrier activation and deactivation function. A method in LTE for fast carrier activation and deactivation is: A network-side device indicates, in a system information block type 5 (SIB5) and/or an RRC connection release message, measurement configuration information for a terminal in a non-connected state (which may be an idle state or an inactive state). The network-side device indicates, in a system information block type 2 (SIB2), that the network-side device is capable of receiving a non-connected-state measurement result of the terminal. When the terminal determines presence of a non-connected-state measurement result and the SIB2 indicates that the network-side device is capable of receiving a non-connected-state measurement result of the terminal, the terminal reports to the network-side device that a non-connected-state measurement result is available. The network-side device can quickly configure and activate a carrier for the terminal based on the non-connected-state measurement result that is reported by the terminal.

However, in some cases, the network-side device indicates to the terminal the measurement configuration information for a non-connected state but the SIB2 does not contain the above indication information, or the SIB2 indicates that the network-side device is incapable of receiving a non-connected-state measurement result of the terminal, but no relevant solution is available for how the terminal should control a terminal behavior. This may cause the terminal to be unable to control the terminal behavior, making communications performance relatively poor.

SUMMARY

Embodiments of this disclosure provide a measurement control method, a terminal, and a network-side device to resolve a problem of relatively poor communications performance because a terminal is unable to control a terminal behavior in the foregoing cases.

To resolve the foregoing technical problem, this disclosure is implemented as follows:

According to a first aspect, an embodiment of this disclosure provides a measurement control method, applied to a terminal, where the terminal is configured with measurement configuration information for a non-connected state. The measurement control method includes:

obtaining a first system message sent by a network-side device; and controlling at least one of the measurement configuration information, a measurement validity timer, a measurement behavior, and a measurement result based on the first system message.

According to a second aspect, an embodiment of this disclosure provides a measurement control method, applied to a network-side device. The measurement control method includes:

sending a first system message to a terminal, where the terminal is configured with measurement configuration information for a non-connected state, and the first system message is used for the terminal to control at least one of the measurement configuration information, a measurement validity timer, a measurement behavior, and a measurement result.

According to a third aspect, an embodiment of this disclosure provides a terminal, where the terminal is configured with measurement configuration information for a non-connected state. The terminal includes:

a first obtaining module, configured to obtain a first system message sent by a network-side device; and a control module, configured to control at least one of the measurement configuration information, a measurement validity timer, a measurement behavior, and a measurement result based on the first system message.

According to a fourth aspect, an embodiment of this disclosure provides a network-side device, including:

a first sending module, configured to send a first system message to a terminal, where the terminal is configured with measurement configuration information for a non-connected state, and the first system message is used for the terminal to control at least one of the measurement configuration information, a measurement validity timer, a measurement behavior, and a measurement result.

According to a fifth aspect, an embodiment of this disclosure provides a terminal, including: a memory, a processor, and a program stored in the memory and capable of running on the processor, where when being executed by the processor, the program implements the steps of the measurement control method corresponding to a terminal, provided according to the embodiments of this disclosure.

According to a sixth aspect, an embodiment of this disclosure provides a network-side device, including: a memory, a processor, and a program stored in the memory and capable of running on the processor, where when being executed by the processor, the program implements the steps of the measurement control method corresponding to a network-side device, provided according to the embodiments of this disclosure.

According to a seventh aspect, an embodiment of this disclosure provides a computer-readable storage medium, where the computer-readable storage medium stores a program, and when being executed by a processor, the program implements the steps of the measurement control method corresponding to a terminal or the steps of the measurement control method corresponding to a network-side device, provided according to the embodiments of this disclosure.

In this way, in the embodiments of this disclosure, the network-side device sends a system message to the terminal, so that the terminal can control the measurement configuration information, measurement validity timer, measurement behavior, or measurement result based on the system message. Because the terminal can control the terminal behavior, communications performance of a communications system can be improved.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DETAILED DESCRIPTION

The following clearly describes the technical solutions in the embodiments of this disclosure with reference to the accompanying drawings in the embodiments of this disclosure. Apparently, the described embodiments are some rather than all of the embodiments of this disclosure. Based on the embodiments of this disclosure, all other embodiments derived by persons of ordinary skill in the art without creative efforts fall within the protection scope of this disclosure.

In the specification and claims of this disclosure, the term "include" and any other variants thereof are intended to cover the non-exclusive inclusion, for example, a process, a method, a system, a product, or a device that includes a list of steps or units is not necessarily limited to those expressly listed steps or units, but may include other steps or units not expressly listed or inherent to such process, method, system, product, or device. In addition, "and/or" used in the specification and claims represents at least one of the associated objects. For example, A and/or B may represent the following three cases: only A, both A and B, and only B.

In the embodiments of this disclosure, terms, such as "illustrative" or "for example", are used to indicate an example, an illustration, or an explanation. Any embodiment or design scheme described by "illustrative" or "for example" in the embodiments of this disclosure should not be explained as being more preferred or more advantageous than other embodiments or design schemes. To be precise, the terms, such as "illustrative" or "for example", are intended to present a related concept in a specific manner.

The following introduces the embodiments of this disclosure with reference to the accompanying drawings. The measurement control method, terminal, and network-side device according to the embodiments of this disclosure may be applied in a wireless communications system. The wireless communications system may be a 5G system, an evolved long term evolution (eLTE) system, or a later evolved communications system.

Figure 1:
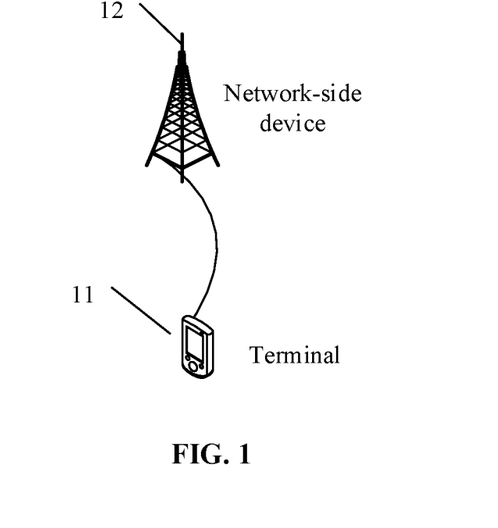
FIG. 1 is a structural diagram of a measurement system according to an embodiment of this disclosure.

FIG. 1 is a structural diagram of a measurement system according to an embodiment of this disclosure. As shown in FIG. 1, the measurement system includes a terminal (User Equipment, UE) 11 and a network-side device 12. The terminal 11 may be a mobile communications terminal, for example, a terminal-side device such as a mobile phone, a tablet computer, a laptop computer, a personal digital assistant (PDA for short), a mobile internet device (MID), or a wearable device. It should be noted that the terminal 11 is not limited to any specific type in this embodiment of this disclosure. The network-side device 12 may be a 5G network-side device (for example, a next generation node base station (gNB) or a 5G new radio node base station (5G NR NB)), a 4G network-side device (for example, an evolved node base station (eNB)), a 3G network-side device (for example, a node base station (NB)), a network-side device in a later evolved communications system, or the like. It should be noted that the network-side device 12 is not limited to any specific type in this embodiment of this disclosure.

In the eLTE and 5G NR systems, in addition to a connected state and an idle state, an independent Radio Resource Control (RRC) state called inactive state is further introduced. The idle state and inactive state can be referred to as non-connected states herein. Therefore, the embodiments of this disclosure can be applied to idle-state or inactive-state terminals in an eLTE or 5G NR system.

At present, the LTE enhanced carrier aggregation (EuCA) project is working on an enhancement to carrier aggregation and has introduced a fast activation and deactivation function. Fast activation and deactivation may refer to fast activation and deactivation of carriers that is applicable to eLTE or 5G NR systems, fast activation and deactivation of secondary cells (SCell) that is applicable to eLTE or 5G NR systems, or fast activation and deactivation of bandwidth parts (BWP) that is applicable to 5G NR systems.

Currently, the following method is provided for fast activation and deactivation of carriers.

A network-side device indicates, in a system broadcast message system information block type 5 (SIB5) and/or an RRC connection release message, a measurement configuration for a terminal in an idle state and/or an inactive state. The network-side device indicates, in a system broadcast message system information block type 2 (SIB2), that the network-side device is capable of receiving an idle-state and/or an inactive-state measurement result of the terminal. When the terminal determines presence of an idle-state or inactive-state measurement result and the system broadcast message SIB2 indicates that the network-side device is capable of receiving an idle-state and/or an inactive-state measurement result of the terminal, the terminal reports to the network-side device that an idle-state or inactive-state measurement result is available. The network-side device quickly configures and activates a carrier for the terminal based on the idle-state or inactive-state measurement result that is reported by the terminal.

However, the foregoing method for fast activation and deactivation of carriers does not provide a technical solution how the terminal should control a terminal behavior when the network-side device indicates to the terminal the measurement configuration information for a non-connected state but the SIB2 does not contain the above indication information, or the SIB2 indicates that the network-side device is incapable of receiving a non-connected-state measurement result of the terminal.

Based on this, the embodiments of this disclosure are intended to provide a measurement control system shown in FIG. 1 and provide a measurement control method applied to the measurement control system. Details are as follows.

In a case that a terminal is configured with measurement configuration information for a non-connected state, the terminal obtains a first system message sent by a network-side device. The terminal controls at least one of the measurement configuration information, a measurement validity timer, a measurement behavior, and a measurement result based on the first system message.

The first system message may meet, but is not limited to meeting, any one of the following conditions:
the first system message does not contain first indication information, where the first indication information is used to indicate that the network-side device is capable of receiving a non-connected-state measurement result of the terminal;
the first system message does not contain second indication information, where the second indication information is used to indicate that a cell supports a carrier aggregation enhancement function or a fast carrier activation and deactivation function;
the first system message contains third indication information, where the third indication information is used to indicate that the network-side device is incapable of receiving a non-connected-state measurement result of the terminal; and
the first system message contains fourth indication information, where the fourth indication information is used to indicate that a cell does not support a carrier aggregation enhancement function or a fast carrier activation and deactivation function.

In this way, in the embodiments of this disclosure, the network-side device sends a system message to the terminal, so that the terminal can control the measurement configuration information, measurement validity timer, measurement behavior, or measurement result based on the system message. Because the terminal can control the terminal behavior, communications performance of a communications system can be improved.

Figure 2:
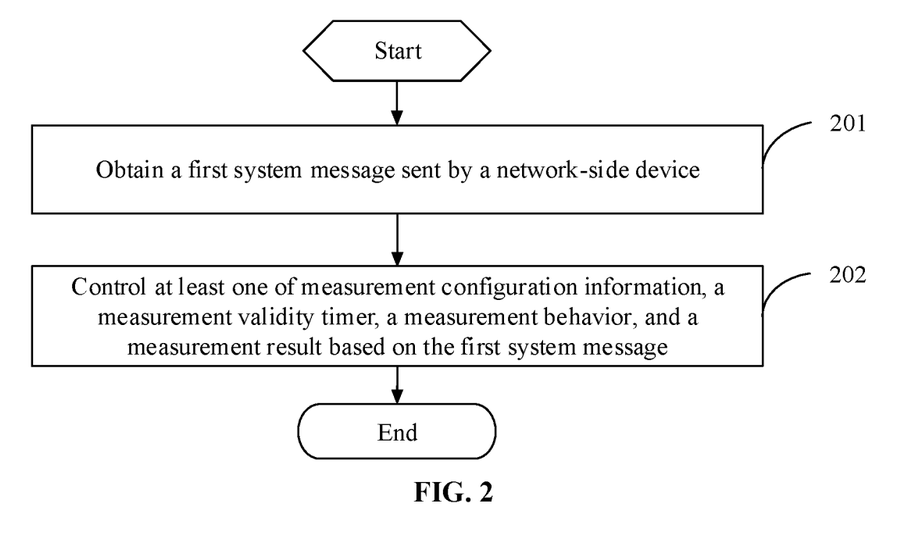
FIG. 2 is a flowchart of a measurement control method according to an embodiment of this disclosure.

FIG. 2 is a flowchart of a measurement control method according to an embodiment of this disclosure.

The measurement control method according to this embodiment of this disclosure is applied to a terminal, and the terminal is configured with measurement configuration information for a non-connected state.

In this embodiment of this disclosure, the terminal may be understood as a terminal that has a measurement capability in a non-connected state. In a 5G NR system, for example, a non-connected state of a terminal may be an idle state or an inactive state. The terminal is a terminal that has a measurement capability in an idle state and/or an inactive state. Before the terminal changes to a network-side device B (the network-side device in the embodiments of this disclosure may be understood as the network-side device B) from a network-side device A, the terminal is configured with measurement configuration information for an idle state and/or an inactive state, where the measurement configuration information may be configured by the network-side device for the terminal through an SIB5 and/or an RRC Connection Release.

As shown in FIG. 2, the measurement control method includes steps 201 and 202.

Step 201: Obtain a first system message sent by the network-side device.

In this step, the terminal can obtain the first system message sent by the network-side device.

The first system message sent by the network-side device may meet, but is not limited to meeting, any one of the following conditions:
the first system message does not contain first indication information, where the first indication information is used to indicate that the network-side device is capable of receiving a non-connected-state measurement result of the terminal;
the first system message does not contain second indication information, where the second indication information is used to indicate that a cell supports a carrier aggregation enhancement function or a fast carrier activation and deactivation function;
the first system message contains third indication information, where the third indication information is used to indicate that the network-side device is incapable of receiving a non-connected-state measurement result of the terminal; and
the first system message contains fourth indication information, where the fourth indication information is used to indicate that a cell does not support a carrier aggregation enhancement function or a fast carrier activation and deactivation function.

In this embodiment of this disclosure, the first system message may be a system broadcast message sent by the network-side device to the terminal through broadcasting, such as an SIB2 or remaining minimum system information (RMSI).

Step 202: Control at least one of the measurement configuration information, a measurement validity timer, a measurement behavior, and a measurement result based on the first system message.

In this step, in a case that the terminal has received the first system message sent by the network-side device, if the first system message meets any one of the foregoing conditions, the terminal may control at least one of these terminal behaviors: the measurement configuration information, measurement validity timer, measurement behavior, and measurement result.

The following describes in detail, through the following embodiments, how the terminal controls the foregoing terminal behaviors.

Embodiment 1: The Terminal May Control the Measurement Configuration Information In this embodiment, the measurement configuration information may include at least one of a measurement duration, a measured frequency, a measured bandwidth or bandwidth part, a valid measurement area or target measurement area, a measurement type, and a measurement report threshold.

The valid measurement area may include, for example, a cell ID list, a physical cell ID (PCI) list, a radio access network notification area (RNA) ID list or a subset thereof, and a core network tracking area (TA) ID list or a subset thereof.

The target measurement area may include, for example, a cell ID list, a PCI LIST, an RNA ID list or a subset thereof, and a TA ID list or a subset thereof.

The measurement type may include, for example, any one or combination of reference signal received power (RSRP), reference signal received quality (RSRQ), and signal to interference plus noise ratio (SINR).

The measurement report threshold may include any one or combination of an RSRP-based threshold, an RSRQ threshold, and an SINR threshold.

In this embodiment, the controlling the measurement configuration information by the terminal may include but is not limited to any one of the following:
- releasing the measurement configuration information by the terminal; and
- retaining the measurement configuration information by the terminal.

In this embodiment, a current cell does not support a carrier aggregation enhancement function or a fast carrier activation and deactivation function, or in the current cell, the network-side device is incapable of receiving a non-connected-state measurement result of the terminal. Therefore, the terminal can directly release the measurement configuration information to stop a measurement behavior that is based on the measurement configuration information, thereby saving power consumption of the terminal.

In addition, in consideration of system message changes, after a period of time after the system message indicates that the network-side device is incapable of receiving a non-connected-state measurement result of the terminal, the network-side device may change the indication through a system message, for example, the system message indicates that the network-side device is capable of receiving a non-connected-state measurement result of the terminal. For another example, in consideration of mobility of the terminal, although the current cell does not support the carrier aggregation enhancement function or fast carrier activation and deactivation function, or in the current cell, the network-side device is incapable of receiving a non-connected-state measurement result of the terminal, a neighboring cell may support the carrier aggregation enhancement function or fast carrier activation and deactivation function, or in a neighboring cell, a network-side device is capable of receiving a non-connected-state measurement result of the terminal. Therefore, the terminal may retain the measurement configuration information, allowing the terminal to report a current available measurement result without the need for the network-side device to reconfigure the measurement configuration information when the system message changes, or when the terminal moves to a cell that supports the carrier aggregation enhancement function or fast carrier activation and deactivation function, or when the terminal moves to a cell in which a network-side device is capable of receiving a non-connected-state measurement result of the terminal, so as to shorten an entire measurement report time and help the network-side device perform fast carrier activation.

In this embodiment, if the terminal has an available measurement result while the terminal retains the measurement configuration information, the terminal can also release the available measurement result to simplify a measurement report behavior of the terminal because in the current cell, the network-side device is incapable of receiving a non-connected-state measurement result of the terminal.

The measurement result may include any one of the following:
- a measurement result of the terminal in an idle state;
- a measurement result of the terminal in an inactive state; and
- measurement results of the terminal in an idle state and an inactive state.

Embodiment 2: The Terminal May Control a Measurement Validity Timer that is Running In this embodiment, the controlling a measurement validity timer that is running by the terminal may include but is not limited to any one of the following:
- considering the measurement validity timer to have expired;
- stopping the measurement validity timer; and
- suspending the measurement validity timer.

In this embodiment, a current cell does not support a carrier aggregation enhancement function or a fast carrier activation and deactivation function, or in the current cell, the network-side device is incapable of receiving a non-connected-state measurement result of the terminal. Therefore, the terminal can consider the measurement validity timer to have expired, stop the measurement validity timer, or suspend the measurement validity timer, so as to stop a measurement behavior that is based on the measurement configuration information, thereby saving power consumption of the terminal.

That the terminal considers the measurement validity timer to have expired may be understood as that the terminal can ignore the measurement validity timer even if the measurement validity timer is running, or the terminal does not respond to the measurement validity timer even if the measurement validity timer is running, or the terminal abandons the measurement validity timer that is running.

In addition, in consideration of system message changes, after a period of time after the system message indicates that the network-side device is incapable of receiving a non-connected-state measurement result of the terminal, the network-side device may change the indication through a system message, for example, the system message indicates that the network-side device is capable of receiving a non-connected-state measurement result of the terminal. For another example, in consideration of mobility of the terminal, although the current cell does not support the carrier aggregation enhancement function or fast carrier activation and deactivation function, or in the current cell, the network-side device is incapable of receiving a non-connected-state measurement result of the terminal, a neighboring cell may support the carrier aggregation enhancement function or fast carrier activation and deactivation function, or in a neighboring cell, a network-side device is capable of receiving a non-connected-state measurement result of the terminal. Therefore, the terminal may suspend the measurement validity timer, allowing the terminal to continue to run the measurement validity timer and report a current available measurement result without the need for the network-side device to reconfigure the measurement timer when the system message changes, or when the terminal moves to a cell that supports the carrier aggregation enhancement function or fast carrier activation and deactivation function, or when the terminal moves to a cell in which the network-side device is capable of receiving a non-connected-state measurement result of the terminal, so as to shorten an entire measurement report time and help the network-side device perform fast carrier activation.

Specifically, in a case that the terminal has suspended the measurement validity timer that is running, if the terminal obtains a second system message sent by the network-side device, the terminal may continue to run the suspended measurement validity timer.

The second system message contains fifth indication information, and the fifth indication information is used to indicate that the network-side device is capable of receiving a non-connected-state measurement result of the terminal, or is used to indicate that a cell supports a carrier aggregation enhancement function or a fast carrier activation and deactivation function.

Embodiment 3: The Terminal May Control an Ongoing Measurement Behavior

In this embodiment, the controlling an ongoing measurement behavior by the terminal may include but is not limited to any one of the following:
  continue measurement by the terminal in a current non-connected state until the measurement validity timer that the terminal is running expires; and
  stop measurement by the terminal in a current non-connected state.

In this embodiment, a current cell does not support a carrier aggregation enhancement function or a fast carrier activation and deactivation function, or in the current cell, the network-side device is incapable of receiving a non-connected-state measurement result of the terminal. Therefore, the terminal can directly stop the measurement behavior of the terminal in the current non-connected state to save power consumption of the terminal.

In addition, considering that the measurement behavior of the terminal is a control based on the measurement duration of the terminal, the terminal may continue the measurement in the current non-connected state until the measurement validity timer that the terminal is running expires.

Embodiment 4: The Terminal May Control a Measurement Result

In this embodiment, the controlling a measurement result by the terminal may include but is not limited to any one of the following:
  releasing a non-connected-state measurement result of the terminal; and
  retaining a non-connected-state measurement result of the terminal until the terminal reports the measurement result to the network-side device.

In this embodiment, a current cell does not support a carrier aggregation enhancement function or a fast carrier activation and deactivation function, or in the current cell, the network-side device is incapable of receiving a non-connected-state measurement result of the terminal. Therefore, the terminal can release the current non-connected-state measurement result of the terminal, so as to simplify a measurement report behavior of the terminal.

In addition, in consideration of system message changes, after a period of time after the system message indicates that the network-side device is incapable of receiving a non-connected-state measurement result of the terminal, the network-side device may change the indication through a system message, for example, the system message indicates that the network-side device is capable of receiving a non-connected-state measurement result of the terminal. For another example, in consideration of mobility of the terminal, although the current cell does not support the carrier aggregation enhancement function or fast carrier activation and deactivation function, or in the current cell, the network-side device is incapable of receiving a non-connected-state measurement result of the terminal, a neighboring cell may support the carrier aggregation enhancement function or fast carrier activation and deactivation function, or in a neighboring cell, a network-side device is capable of receiving a non-connected-state measurement result of the terminal. Therefore, the terminal may retain a non-connected-state measurement result, allowing the terminal to report the non-connected-state measurement result to the network-side device when the system message changes, or when the terminal moves to a cell that supports the carrier aggregation enhancement function or fast carrier activation and deactivation function, or when the terminal moves to a cell in which the network-side device is capable of receiving a non-connected-state measurement result of the terminal, so as to shorten an entire measurement report time and help the network-side device perform fast carrier activation.

In this way, in this embodiment of this disclosure, the network-side device sends a system message to the terminal, so that the terminal can control the measurement configuration information, measurement validity timer, measurement behavior, or measurement result based on the system message. Because the terminal can control the terminal behavior, communications performance of a communications system can be improved.

Figure 3:
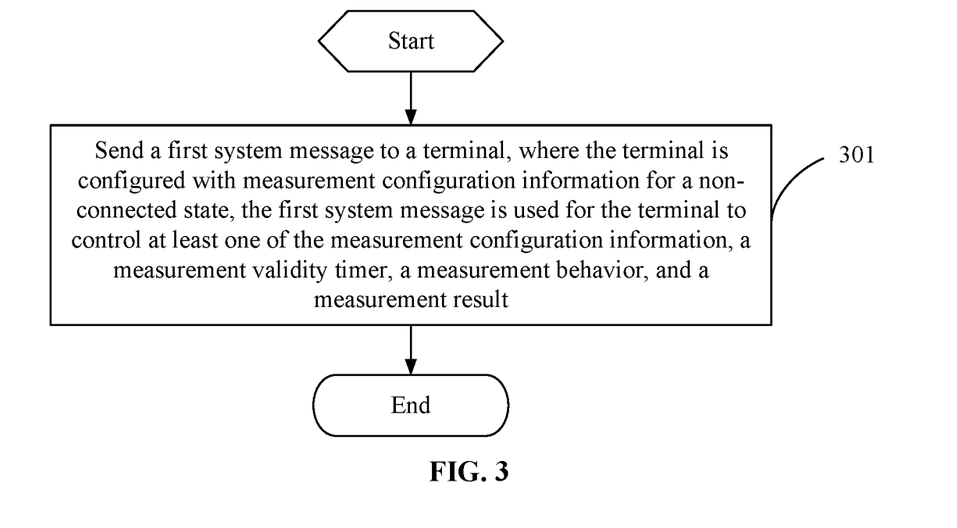
FIG. 3 is a flowchart of another measurement control method according to an embodiment of this disclosure.

FIG. 3 is a flowchart of another measurement control method according to an embodiment of this disclosure. As shown in FIG. 3, the measurement control method is applied to a network-side device and includes the following steps.

Step 301: Send a first system message to a terminal, where the terminal is configured with measurement configuration information for a non-connected state, and the first system message is used for the terminal to control at least one of the measurement configuration information, a measurement validity timer, a measurement behavior, and a measurement result.

Optionally, the first system message meets any one of the following conditions:
  the first system message does not contain first indication information, where the first indication information is used to indicate that the network-side device is capable of receiving a non-connected-state measurement result of the terminal;
  the first system message does not contain second indication information, where the second indication information is used to indicate that a cell supports a carrier aggregation enhancement function or a fast carrier activation and deactivation function;
  the first system message contains third indication information, where the third indication information is used to indicate that the network-side device is incapable of receiving a non-connected-state measurement result of the terminal; and
  the first system message contains fourth indication information, where the fourth indication information is used to indicate that a cell does not support a carrier aggregation enhancement function or a fast carrier activation and deactivation function.

Optionally, the measurement control method further includes:
  sending a second system message to the terminal, where in a case that the terminal has suspended the measurement validity timer, the second system message is used for the terminal to continue to run the measurement validity timer.

The second system message contains fifth indication information, and the fifth indication information is used to indicate that the network-side device is capable of receiving a non-connected-state measurement result of the terminal, or is used to indicate that a cell supports a carrier aggregation enhancement function or a fast carrier activation and deactivation function.

Optionally, the measurement configuration information includes at least one of a measurement duration, a measured frequency, a measured bandwidth or bandwidth part, a valid measurement area or target measurement area, a measurement type, and a measurement report threshold.

Optionally, the non-connected state includes at least one of an idle state and an inactive state.

It should be noted that for specific implementations of this embodiment of this disclosure as an embodiment of the network-side device corresponding to the embodiment shown in FIG. 2, reference may be made to the relevant descriptions about the embodiment shown in FIG. 2, and the same beneficial effect can be achieved. To avoid repetition, details are not described herein again.

Figure 4:
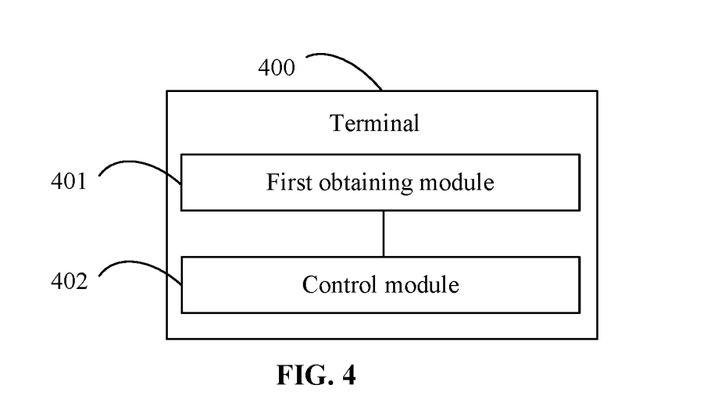
FIG. 4 is a structural diagram of a terminal according to an embodiment of this disclosure.

FIG. 4 is a structural diagram of a terminal according to an embodiment of this disclosure. As shown in FIG. 4, the terminal 400 includes:
a first obtaining module 401, configured to obtain a first system message sent by a network-side device; and
a control module 402, configured to control at least one of the measurement configuration information, a measurement validity timer, a measurement behavior, and a measurement result based on the first system message.

Optionally, the first system message meets any one of the following conditions:
the first system message does not contain first indication information, where the first indication information is used to indicate that the network-side device is capable of receiving a non-connected-state measurement result of the terminal;
the first system message does not contain second indication information, where the second indication information is used to indicate that a cell supports a carrier aggregation enhancement function or a fast carrier activation and deactivation function;
the first system message contains third indication information, where the third indication information is used to indicate that the network-side device is incapable of receiving a non-connected-state measurement result of the terminal; and
the first system message contains fourth indication information, where the fourth indication information is used to indicate that a cell does not support a carrier aggregation enhancement function or a fast carrier activation and deactivation function.

Optionally, the control module 402 is specifically configured to control the measurement configuration information, including:
being configured to retain the measurement configuration information; or being configured to release the measurement configuration information.

Optionally, the control module 402 is specifically configured to control the measurement validity timer, including:
being configured to consider the measurement validity timer to have expired;
being configured to stop the measurement validity timer; or
being configured to suspend the measurement validity timer.

Figure 5:
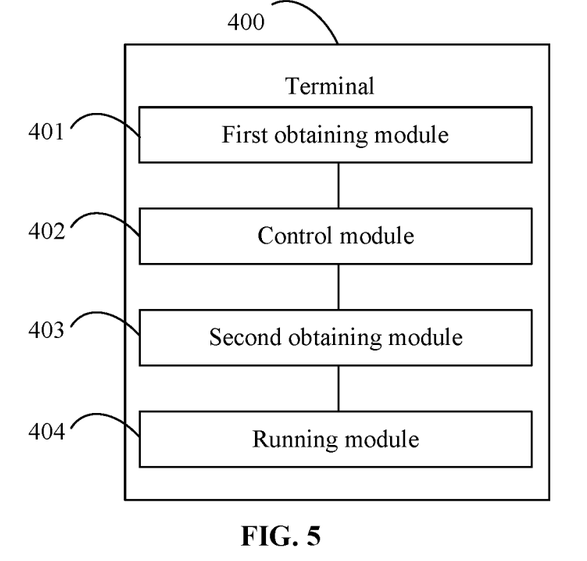
FIG. 5 is a structural diagram of another terminal according to an embodiment of this disclosure.

Optionally, as shown in FIG. 5, in a case that the control module 402 is configured to suspend the measurement validity timer, the terminal 400 further includes:
a second obtaining module 403, configured to obtain a second system message sent by the network-side device; and
a running module 404, configured to continue to run the measurement validity timer.

The second system message contains fifth indication information, and the fifth indication information is used to indicate that the network-side device is capable of receiving a non-connected-state measurement result of the terminal, or is used to indicate that a cell supports a carrier aggregation enhancement function or a fast carrier activation and deactivation function.

Optionally, the control module 402 is specifically configured to control the measurement behavior, including:
being configured to continue measurement by the terminal in a current non-connected state until the measurement validity timer that the terminal is running expires; or
being configured to stop measurement of the terminal in a current non-connected state.

Optionally, the control module 402 is specifically configured to control the measurement result, including:
being configured to release a non-connected-state measurement result of the terminal; or
being configured to retain a non-connected-state measurement result of the terminal until the terminal reports the measurement result to the network-side device.

Optionally, the measurement configuration information includes at least one of a measurement duration, a measured frequency, a measured bandwidth or bandwidth part, a valid measurement area or target measurement area, a measurement type, and a measurement report threshold.

Optionally, the non-connected state includes at least one of an idle state and an inactive state.

It should be noted that the terminal 400 in this embodiment of this disclosure may be a terminal in any implementation of the method embodiments. Any implementation of the terminal in the method embodiments can be implemented by the terminal 400 in this embodiment of this disclosure, and the same beneficial effect can be achieved. To avoid repetition, details are not described herein again.

Figure 6:
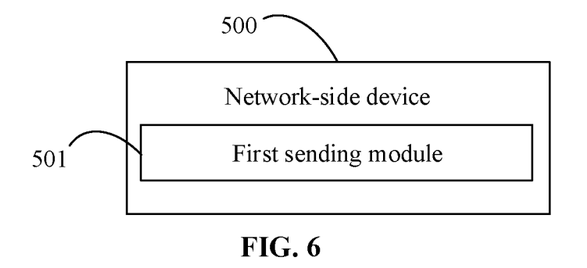
FIG. 6 is a structural diagram of a network-side device according to an embodiment of this disclosure.

Referring to FIG. 6, FIG. 6 is a structural diagram of a network-side device according to an embodiment of this disclosure. As shown in FIG. 6, the network-side device 500 includes: a first sending module 501, configured to send a first system message to a terminal, where the terminal is configured with measurement configuration information for a non-connected state, and the first system message is used for the terminal to control at least one of the measurement configuration information, a measurement validity timer, a measurement behavior, and a measurement result.

Optionally, the first system message meets any one of the following conditions:
the first system message does not contain first indication information, where the first indication information is used to indicate that the network-side device is capable of receiving a non-connected-state measurement result of the terminal;
the first system message does not contain second indication information, where the second indication information is used to indicate that a cell supports a carrier aggregation enhancement function or a fast carrier activation and deactivation function;
the first system message contains third indication information, where the third indication information is used to indicate that the network-side device is incapable of receiving a non-connected-state measurement result of the terminal; and
the first system message contains fourth indication information, where the fourth indication information is used to indicate that a cell does not support a carrier aggregation enhancement function or a fast carrier activation and deactivation function.

Figure 7:
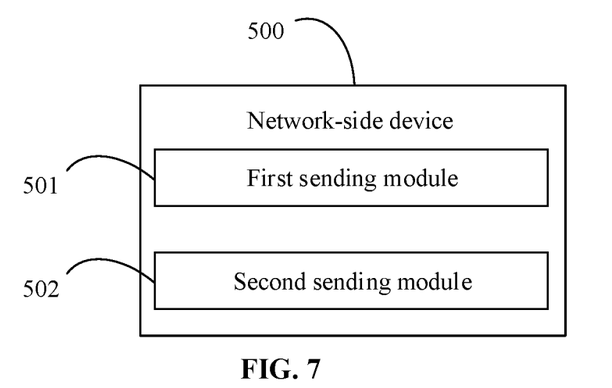
FIG. 7 is a structural diagram of another network-side device according to an embodiment of this disclosure.

Optionally, as shown in FIG. 7, the network-side device 500 further includes:

a second sending module 502, configured to send a second system message to the terminal, where in a case that the terminal has suspended the measurement validity timer, the second system message is used for the terminal to continue to run the measurement validity timer.

The second system message contains fifth indication information, and the fifth indication information is used to indicate that the network-side device is capable of receiving a non-connected-state measurement result of the terminal, or is used to indicate that a cell supports a carrier aggregation enhancement function or a fast carrier activation and deactivation function.

Optionally, the measurement configuration information includes at least one of a measurement duration, a measured frequency, a measured bandwidth or bandwidth part, a valid measurement area or target measurement area, a measurement type, and a measurement report threshold.

Optionally, the non-connected state includes at least one of an idle state and an inactive state.

It should be noted that the network-side device 500 in this embodiment of this disclosure may be a network-side device in any implementation of the method embodiments. Any implementation of the network-side device in the method embodiments can be implemented by the network-side device 500 in this embodiment of this disclosure, and the same beneficial effect can be achieved. To avoid repetition, details are not described herein again.

Figure 8:
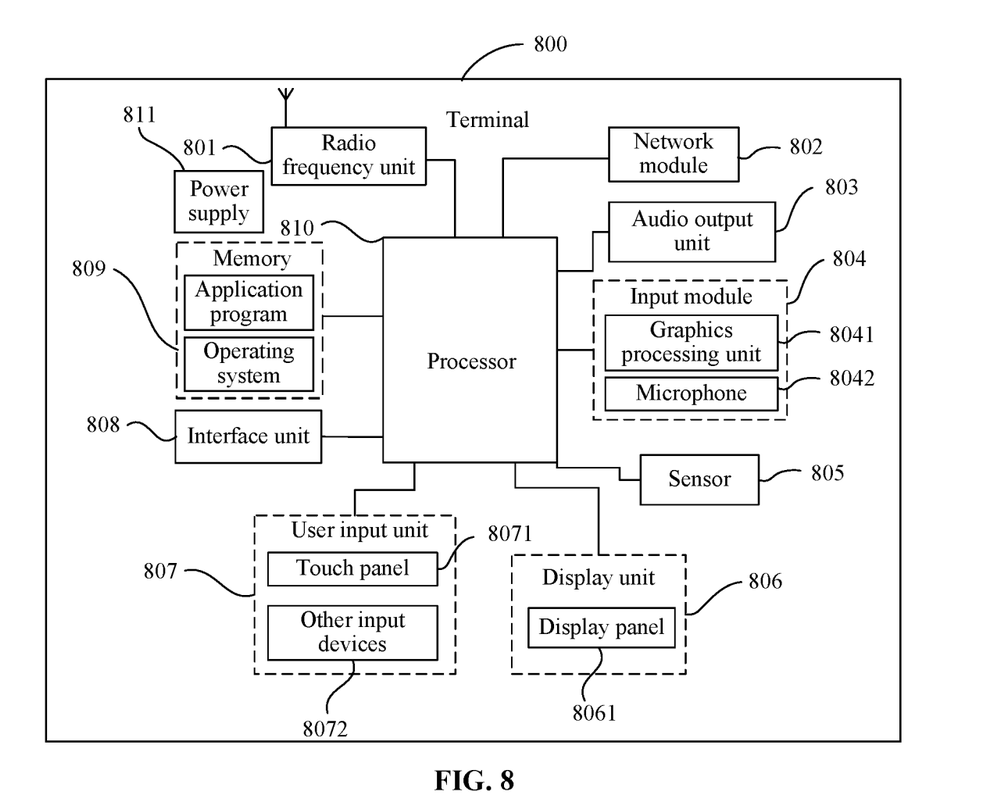
FIG. 8 is a schematic diagram of a hardware structure of a terminal according to an embodiment of this disclosure.

Referring FIG. 8, FIG. 8 is a schematic diagram of a hardware structure of a terminal that implements the embodiments of this disclosure. The terminal 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art can understand that the structure of UE shown in FIG. 8 does not constitute any limitation on the UE, and the terminal may include more or fewer components than those shown in the figure, or a combination of some of the components, or a different arrangement of the components. In the embodiments of this disclosure, the terminal includes but is not limited to a mobile phone, a tablet computer, a laptop computer, a personal digital assistant, an in-vehicle terminal, a wearable device, or a pedometer.

The terminal is configured with measurement configuration information for a non-connected state. The processor 810 is configured to:

obtain a first system message sent by a network-side device; and control at least one of the measurement configuration information, a measurement validity timer, a measurement behavior, and a measurement result based on the first system message.

Optionally, the first system message meets any one of the following conditions:

the first system message does not contain first indication information, where the first indication information is used to indicate that the network-side device is capable of receiving a non-connected-state measurement result of the terminal;

the first system message does not contain second indication information, where the second indication information is used to indicate that a cell supports a carrier aggregation enhancement function or a fast carrier activation and deactivation function;

the first system message contains third indication information, where the third indication information is used to indicate that the network-side device is incapable of receiving a non-connected-state measurement result of the terminal; and the first system message contains fourth indication information, where the fourth indication information is used to indicate that a cell does not support a carrier aggregation enhancement function or a fast carrier activation and deactivation function.

Optionally, controlling the measurement configuration information by the processor 810 includes:

retaining the measurement configuration information; or
releasing the measurement configuration information.

Optionally, controlling the measurement validity timer by the processor 810 includes:

considering the measurement validity timer to have expired;
stopping the measurement validity timer; or
suspending the measurement validity timer.

Optionally, in a case that the processor 810 has suspended the measurement validity timer, the processor 810 is further configured to:

obtaining a second system message sent by the network-side device; and
continuing to run the measurement validity timer.

The second system message contains fifth indication information, and the fifth indication information is used to indicate that the network-side device is capable of receiving a non-connected-state measurement result of the terminal, or is used to indicate that a cell supports a carrier aggregation enhancement function or a fast carrier activation and deactivation function.

Optionally, controlling the measurement behavior by the processor 810 includes:

continuing measurement by the terminal in a current non-connected state until the measurement validity timer that the terminal is running expires; or
stopping measurement by the terminal in a current non-connected state.

Optionally, controlling the measurement result by the processor 810 includes:

releasing a non-connected-state measurement result of the terminal; or
retaining a non-connected-state measurement result of the terminal until the terminal reports the measurement result to the network-side device.

Optionally, the measurement configuration information includes at least one of a measurement duration, a measured frequency, a measured bandwidth or bandwidth part, a valid measurement area or target measurement area, a measurement type, and a measurement report threshold.

Optionally, the non-connected state includes at least one of an idle state and an inactive state.

In this embodiment of this disclosure, the network-side device sends a system message to the terminal, so that the terminal can control the measurement configuration information, measurement validity timer, measurement behavior, or measurement result based on the system message. Because the terminal can control the terminal behavior, communications performance of a communications system can be improved.

It should be understood that in this embodiment of this disclosure, the radio frequency unit 801 may be configured to receive and send signals during an information receiving and sending process or a call process. Specifically, the radio frequency unit 801 receives downlink data from a base station and delivers the downlink data to the processor 810 for processing; and in addition, the radio frequency unit 801 sends uplink data to the base station. Typically, the radio frequency unit 801 includes but is not limited to an antenna, at least one amplifier, a transceiver, a coupler, a low noise amplifier, a duplexer, and the like. In addition, the radio frequency unit 801 may further communicate with a network and other devices through a wireless communication system.

The terminal provides wireless broadband internet access for a user by using the network module 802 and helps the user to, for example, send or receive an email, browse a webpage, or access streaming media.

The audio output unit 803 may convert audio data that is received by the radio frequency unit 801 or the network module 802 or that is stored in the memory 809 into an audio signal and outputs the audio signal as a sound. In addition, the audio output unit 803 may further provide audio output related to a specific function (for example, a call signal received sound and a message received sound) executed by the terminal 800. The audio output unit 803 includes a loudspeaker, a buzzer, a receiver, and the like.

The input unit 804 is configured to receive an audio or video signal. The input unit 804 may include a graphics processing unit (GPU) 8041 and a microphone 8042. The graphics processing unit 8041 processes image data in a static picture or video obtained by an image capturing apparatus (for example, a camera) in a video capturing mode or an image capturing mode. A processed image frame may be displayed on the display unit 806. The image frame obtained after processing by the graphics processing unit 8041 may be stored in the memory 809 (or other storage media) or sent by the radio frequency unit 801 or the network module 802. The microphone 8042 may receive a sound and is capable of processing the sound as audio data. The processed audio data may be converted, in a phone service mode, into a format that can be sent by the radio frequency 801 to a mobile communication base station.

The terminal 800 may further include at least one sensor 805, for example, a light sensor, a motion sensor, and other sensors. Specifically, the light sensor includes an ambient light sensor and a proximity sensor. The ambient light sensor may adjust luminance of a display panel 8061 based on brightness of ambient light, and the proximity sensor may turn off the display panel 8061 and backlighting when the terminal 800 moves to an ear. As a type of motion sensor, an accelerometer sensor can detect a value of an acceleration in each direction (usually, there are three axes), can detect a magnitude and a direction of gravity when the terminal is static, and may be configured for terminal posture recognition (for example, screen switching between landscape and portrait, a related game, and magnetometer posture calibration), vibration recognition related functions (for example, pedometer and knocking), and the like. The sensor 805 may further include a fingerprint sensor, a pressure sensor, an iris sensor, a molecular sensor, a gyroscope, a barometer, a hygrometer, a thermometer, an infrared sensor, or the like. Details are not described herein.

The display unit 806 is configured to display information input by the user or information provided for the user. The display unit 806 may include the display panel 8061. The display panel 8061 may be configured in a form of a liquid crystal display (LCD), an organic light-emitting diode (OLED), or the like.

The user input unit 807 may be configured to receive input digit or character information, and generate a key signal input related to user settings and function control of the terminal. Specifically, the user input unit 807 may include a touch control panel 8071 and other input devices 8072. The touch panel 8071, also referred to as a touchscreen, may capture a touch operation of a user on or near the touch panel 8071 (for example, an operation performed by the user by using any appropriate object or accessory such as a finger or a stylus on the touch panel 8071 or near the touch panel 8071). The touch panel 8071 may include two parts: a touch detection apparatus and a touch controller. The touch detection apparatus detects a touch orientation of the user, detects a signal brought by the touch operation, and transfers the signal to the touch controller. The touch controller receives touch information from the touch detection apparatus, converts the touch information into touch coordinates, and transmits the touch coordinates to the processor 810, and receives and executes a command sent by the processor 810. In addition, the touch panel 8071 may be implemented in various types, for example, a resistive, capacitive, infrared, and surface acoustic wave touch panel. The user input unit 807 may include other input devices 8072 in addition to the touch panel 8071. Specifically, the other input devices 8072 may include but are not limited to a physical keyboard, a function key (such as a volume control key or a power on/off key), a trackball, a mouse, a joystick, or the like. Details are not described herein.

Further, the touch panel 8071 may cover the display panel 8061. After detecting a touch operation on or near the touch panel 8071, the touch panel 8071 transfers the touch operation to the processor 810 for determining a touch event type. Subsequently, the processor 810 provides corresponding visual output on the display panel 8061 based on the touch event type. In FIG. 8, the touch panel 8071 and the display panel 8061 are used as two separate components to implement input and output functions of the terminal. However, in some embodiments, the touch panel 8071 may be integrated with the display panel 8061 to implement the input and output functions of the terminal. This is not specifically limited herein.

The interface unit 808 is an interface for an external apparatus to connect to the terminal 800. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 808 may be configured to receive input (such as data information and electricity) from the external apparatus and transmits the received input to one or more elements in the terminal 800 or may be configured to transmit data between the terminal 800 and the external apparatus.

The memory 809 may be configured to store software programs and various types of data. The memory 809 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 809 may include a high-speed random access memory, and may further include a non-volatile memory such as at least one disk storage device, a flash memory device, or other volatile solid-state storage devices.

The processor 810 is a control center of the terminal that connects various parts of the entire terminal by using various interfaces or lines. The processor 810 performs various functions of the terminal and processes data by running or executing software programs and/or modules stored in the memory 809 and calling data stored in the memory 809, so as to perform overall monitoring on the terminal. The processor 810 may include one or more processing units. Optionally, an application processor and a modem processor may be integrated into the processor 810. The application processor mainly processes the operating system, user interface, application program, and the like. The modem processor mainly processes wireless communication. It can be understood that the modem processor may alternatively not be integrated into the processor 810.

The terminal 800 may further include the power supply 811 (for example, a battery) that supplies power to the components. Optionally, the power supply 811 may be logically connected to the processor 810 through a power supply management system. In this way, functions such as charging management, discharging management, and power consumption management are implemented by the power supply management system.

In addition, the terminal 800 includes some function modules that are not shown. Details are not described herein.

Optionally, an embodiment of this disclosure further provides a terminal, including: a processor 810, a memory 809, and a computer program stored in the memory 809 and capable of running on the processor 810. When the computer program is executed by the processor 810, the procedures in the foregoing embodiments of the measurement control method are implemented, with the same technical effect achieved. To avoid repetition, details are not described herein again.

Figure 9:
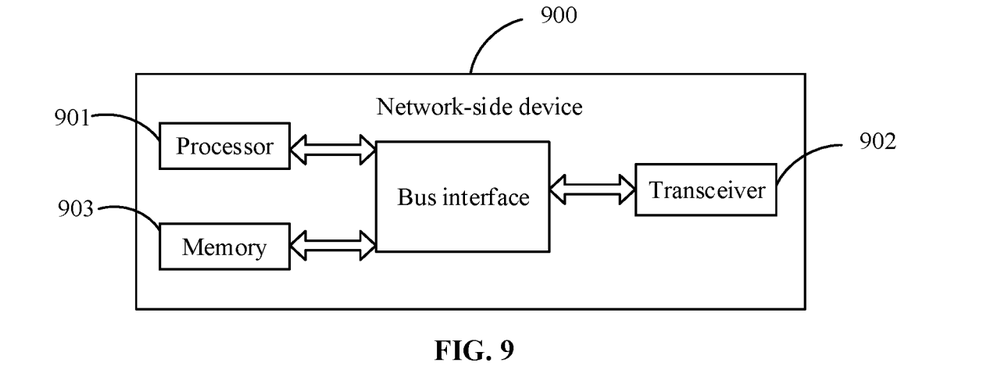
FIG. 9 is a schematic diagram of a hardware structure of a network-side device according to an embodiment of this disclosure.

Referring to FIG. 9, FIG. 9 is a structural diagram of another network-side device according to an embodiment of this disclosure. As shown in FIG. 9, the network-side device 900 includes a processor 901, a transceiver 902, a memory 903, and a bus interface.

The transceiver 902 is configured to:
send a first system message to a terminal, where the terminal is configured with measurement configuration information for a non-connected state, and the first system message is used for the terminal to control at least one of the measurement configuration information, a measurement validity timer, a measurement behavior, and a measurement result.

Optionally, the first system message meets any one of the following conditions:
the first system message does not contain first indication information, where the first indication information is used to indicate that the network-side device is capable of receiving a non-connected-state measurement result of the terminal;
the first system message does not contain second indication information, where the second indication information is used to indicate that a cell supports a carrier aggregation enhancement function or a fast carrier activation and deactivation function;
the first system message contains third indication information, where the third indication information is used to indicate that the network-side device is incapable of receiving a non-connected-state measurement result of the terminal; and
the first system message contains fourth indication information, where the fourth indication information is used to indicate that a cell does not support a carrier aggregation enhancement function or a fast carrier activation and deactivation function.

Optionally, the transceiver 902 is further configured to:
send a second system message to the terminal, where in a case that the terminal has suspended the measurement validity timer, the second system message is used for the terminal to continue to run the measurement validity timer.

The second system message contains fifth indication information, and the fifth indication information is used to indicate that the network-side device is capable of receiving a non-connected-state measurement result of the terminal, or is used to indicate that a cell supports a carrier aggregation enhancement function or a fast carrier activation and deactivation function.

Optionally, the measurement configuration information includes at least one of a measurement duration, a measured frequency, a measured bandwidth or bandwidth part, a valid measurement area or target measurement area, a measurement type, and a measurement report threshold.

Optionally, the non-connected state includes at least one of an idle state and an inactive state.

In FIG. 9, a bus architecture may include any quantity of interconnected buses and bridges that are specifically connected by using various circuits of one or more processors represented by the processor 901 and a memory represented by the memory 903. The bus architecture may further connect various other circuits such as peripheral device, voltage stabilizer, and power management circuits. These are well known in the art, and therefore are not further described in this specification. The bus interface provides interfaces. The transceiver 902 may be a plurality of components, including a transmitter and a receiver, and provides units for communicating with various other apparatuses on a transmission medium. For different user equipments, the bus interface may further include interfaces capable of connecting necessary external and internal devices. The devices connected include but are not limited to a keypad, a display, a loudspeaker, a microphone, and a joystick.

The processor 901 is responsible for management of the bus architecture and general processing, and the memory 903 may store data for use by the processor 901 during an operation.

It should be noted that the network-side device 900 in this embodiment may be a network-side device in any implementation of the method embodiments of this disclosure. Any implementation of the network-side device in the method embodiments of this disclosure can be implemented by the network-side device 900 in this embodiment, and the same beneficial effect can be achieved. Details are not described herein again.

An embodiment of this disclosure further provides a computer-readable storage medium. The computer-readable storage medium stores a computer program. When the computer program is executed by a processor, the procedures in the foregoing embodiments of the measurement control method corresponding to a network-side device or a terminal are implemented with the same technical effect achieved. To avoid repetition, details are not described herein again. The computer-readable storage medium may be a read-only memory (ROM for short), a random access memory (RAM for short), a magnetic disk, or an optical disc.

It should be noted that in this specification, the terms "include", "comprise", or any of their variants are intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the method in the foregoing embodiments may be implemented by using software in combination with a necessary general hardware platform, and certainly may alternatively be implemented by using hardware, while the former is a more preferred implementation in most cases. Based on such an understanding, the technical solutions of this disclosure essentially, or the part contributing to the prior art may be implemented in a form of a software product. The software product is stored in a storage medium (such as a ROM, a RAM, a magnetic disk, or an optical disc), and includes several instructions for instructing a terminal (which may be a mobile phone, a personal computer, a server, an air conditioner, a network device, or the like) to perform the methods described in the embodiments of this disclosure.

The foregoing descriptions are only specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

The invention claimed is:

1. A measurement control method, performed by a terminal, wherein the terminal is configured with measurement configuration information for a non-connected state, and the measurement control method comprises:
obtaining a first system message sent by a network-side device; and
continuing measurement by the terminal in a current non-connected state until a measurement validity timer that the terminal is running expires, based on the first system message;
wherein the first system message is configured to indicate:
whether the network-side device supports receiving a non-connected-state measurement result of the terminal;
wherein the non-connected state comprises at least one of an idle state or an inactive state;
wherein the first system message being configured to indicate whether the network-side device supports receiving the non-connected-state measurement result of the terminal comprises:
the first system message indicating whether the network-side device supports receiving the non-connected-state measurement result of the terminal, based on whether first indication information exists, wherein the first indication information is configured to indicated that the network-side device supports receiving the non-connected-state measurement result of the terminal;
wherein the continuing measurement by the terminal in a current non-connected state until a measurement validity timer that the terminal is running expires, based on the first system message further comprises:
in a case that the first indication information is absent in the first system message, continuing measurement by the terminal in the current non-connected state until the measurement validity timer that the terminal is running expires.

2. The measurement control method according to claim 1, wherein subsequent to the obtaining the first system message sent by the network-side device, the method further comprises:
retaining the measurement configuration information; or
releasing the measurement configuration information.

3. The measurement control method according to claim 1, wherein the first system message is system broadcast message System Information Block Type 2 (SIB2) or Remaining Minimum System Information (RMSI).

4. The measurement control method according to claim 1, wherein subsequent to the obtaining the first system message sent by the network-side device, the method further comprises:
releasing a non-connected-state measurement result of the terminal; or
retaining a non-connected-state measurement result of the terminal until the terminal reports the measurement result to the network-side device.

5. The measurement control method according to claim 1, wherein the measurement configuration information comprises at least one of a measurement duration, a measured frequency, a measured bandwidth or bandwidth part, a valid measurement area or target measurement area, a measurement type, or a measurement report threshold;
wherein the valid measurement area comprises a cell ID list, a physical cell ID (PCI) list, a radio access network notification area (RNA) ID list or a subset of the RNA ID list, and a core network tracking area (TA) ID list or a subset of the core network TA ID list;
the target measurement area comprises a cell ID list, a PCI list, an RNA ID list or a subset of the RNA ID list comprised in the target measurement area, and a TA ID list or a subset of the TA ID list comprised in the target measurement area;
the measurement type comprises at least one of reference signal received power (RSRP), reference signal received quality (RSRQ), and signal to interference plus noise ratio (SINR);
the measurement report threshold comprises at least one of an RSRP-based threshold, an RSRQ threshold, and an SINR threshold.

6. The measurement control method according to claim 1, wherein the measurement configuration information is configured through at least one of:
system broadcast message System Information Block Type 5 (SIB5) or an RRC connection release message.

7. The measurement control method according to claim 1, wherein the continuing measurement by the terminal in the current non-connected state until the measurement validity timer that the terminal is running expires based on the first system message comprises:
when indication information exists in the first system message, the UE determining that the network-side device supports receiving the non-connected-state measurement result of the terminal;
when indication information absents in the first system message, the UE determining that the network-side device does not support receiving the non-connected-state measurement result of the terminal;
and/or
when indication information exists in the first system message, the UE determining that the cell supports the carrier aggregation enhancement function or the fast carrier activation and deactivation function;
when indication information absents in the first system message, the UE determining that the cell does not support the carrier aggregation enhancement function or the fast carrier activation and deactivation function;

continuing measurement by the terminal in the current non-connected state until the measurement validity timer that the terminal is running expires, based on at least one of whether the network-side device supports receiving the non-connected-state measurement result of the terminal or whether the cell supports the carrier aggregation enhancement function or the fast carrier activation and deactivation function.

8. A terminal, comprising a memory, a processor, and a program stored in the memory and capable of running on the processor, wherein when being executed by the processor, the program implements:

obtaining a first system message sent by a network-side device; and continuing measurement by the terminal in a current non-connected state until a measurement validity timer that the terminal is running expires, based on the first system message;

wherein the first system message is configured to indicate:

whether the network-side device supports receiving a non-connected-state measurement result of the terminal;

wherein the non-connected state comprises at least one of an idle state or an inactive state;

wherein the first system message being configured to indicate whether the network-side device supports receiving the non-connected-state measurement result of the terminal comprises:

the first system message indicating whether the network-side device supports receiving the non-connected-state measurement result of the terminal, based on whether first indication information exists, wherein the first indication information is configured to indicated that the network-side device supports receiving the non-connected-state measurement result of the terminal;

wherein when being executed by the processor, the program implements:

in a case that the first indication information is absent in the first system message, continuing measurement by the terminal in the current non-connected state until the measurement validity timer that the terminal is running expires.

9. The terminal according to claim 8, wherein subsequent to the obtaining the first system message sent by the network-side device, when being executed by the processor, the program implements:

retaining the measurement configuration information; or
releasing the measurement configuration information.

10. The terminal according to claim 8, wherein the first system message is system broadcast message System Information Block Type 2 (SIB2) or Remaining Minimum System Information (RMSI).

11. The terminal according to claim 8, wherein subsequent to the obtaining the first system message sent by the network-side device, when being executed by the processor, the program implements:

releasing a non-connected-state measurement result of the terminal; or retaining a non-connected-state measurement result of the terminal until the terminal reports the measurement result to the network-side device.

12. The terminal according to claim 8, wherein the measurement configuration information comprises at least one of a measurement duration, a measured frequency, a measured bandwidth or bandwidth part, a valid measurement area or target measurement area, a measurement type, or a measurement report threshold;

wherein the valid measurement area comprises a cell ID list, a physical cell ID (PCI) list, a radio access network notification area (RNA) ID list or a subset of the RNA ID list, and a core network tracking area (TA) ID list or a subset of the core network TA ID list;

the target measurement area comprises a cell ID list, a PCI list, an RNA ID list or a subset of the RNA ID list comprised in the target measurement area, and a TA ID list or a subset of the TA ID list comprised in the target measurement area;

the measurement type comprises at least one of reference signal received power (RSRP), reference signal received quality (RSRQ), and signal to interference plus noise ratio (SINR);

the measurement report threshold comprises at least one of an RSRP-based threshold, an RSRQ threshold, and an SINR threshold.

13. The terminal according to claim 8, wherein the measurement configuration information is configured through at least one of:

system broadcast message System Information Block Type 5 (SIB5) or an RRC connection release message.

14. The terminal according to claim 8, wherein the continuing measurement by the terminal in the current non-connected state until the measurement validity timer that the terminal is running expires based on the first system message comprises:

when indication information exists in the first system message, determining that the network-side device supports receiving the non-connected-state measurement result of the terminal;

when indication information absents in the first system message, determining that the network-side device does not support receiving the non-connected-state measurement result of the terminal;

and/or when indication information exists in the first system message, determining that the cell supports the carrier aggregation enhancement function or the fast carrier activation and deactivation function;

when indication information absents in the first system message, determining that the cell does not support the carrier aggregation enhancement function or the fast carrier activation and deactivation function;

continuing measurement by the terminal in the current non-connected state until the measurement validity timer that the terminal is running expires, based on at least one of whether the network-side device supports receiving the non-connected-state measurement result of the terminal or whether the cell supports the carrier aggregation enhancement function or the fast carrier activation and deactivation function.

15. A non-transitory computer-readable storage medium, wherein the computer-readable storage medium stores a program, and when being executed by a processor, the program implements:

obtaining a first system message sent by a network-side device; and continuing measurement by the terminal in a current non-connected state until a measurement validity timer that the terminal is running expires, based on the first system message;

wherein the first system message is configured to indicate:
whether the network-side device supports receiving a non-connected-state measurement result of the terminal;
wherein the non-connected state comprises at least one of an idle state or an inactive state;
wherein the first system message being configured to indicate whether the network-side device supports receiving the non-connected-state measurement result of the terminal comprises:
the first system message indicating whether the network-side device supports receiving the non-connected-state measurement result of the terminal, based on whether first indication information exists, wherein the first indication information is configured to indicated that the network-side device supports receiving the non-connected-state measurement result of the terminal;
wherein when being executed by a processor, the program implements:
in a case that the first indication information is absent in the first system message, continuing measurement by the terminal in the current non-connected state until the measurement validity timer that the terminal is running expires.

16. The non-transitory computer-readable storage medium according to claim 15, wherein when being executed by the processor, the program implements:

when indication information exists in the first system message, determining that the network-side device supports receiving the non-connected-state measurement result of the terminal;
when indication information absents in the first system message, determining that the network-side device does not support receiving the non-connected-state measurement result of the terminal;
and/or
when indication information exists in the first system message, determining that the cell supports the carrier aggregation enhancement function or the fast carrier activation and deactivation function;
when indication information absents in the first system message, determining that the cell does not support the carrier aggregation enhancement function or the fast carrier activation and deactivation function;
continuing measurement by the terminal in the current non-connected state until the measurement validity timer that the terminal is running expires, based on at least one of whether the network-side device supports receiving the non-connected-state measurement result of the terminal or whether the cell supports the carrier aggregation enhancement function or the fast carrier activation and deactivation function.

\* \* \* \* \*